(12) United States Patent
Kerin et al.

(10) Patent No.: US 11,333,235 B2
(45) Date of Patent: May 17, 2022

(54) HYBRID DRIVE COMPONENT

(71) Applicant: NHI Mechanical Motion, LLC, Claremont, NH (US)

(72) Inventors: Zachary Patrick Kerin, White River Junction, VT (US); Kevin James Guay, West Lebanon, NH (US)

(73) Assignee: NHI Mechanical Motion, LLC, Claremont, NH (US)

( * ) Notice: Subject to any disclaimer, the term of this patent is extended or adjusted under 35 U.S.C. 154(b) by 202 days.

(21) Appl. No.: 16/441,695

(22) Filed: Jun. 14, 2019

(65) Prior Publication Data

US 2020/0393032 A1    Dec. 17, 2020

(51) Int. Cl.
*F16H 55/36*    (2006.01)
*F16H 55/48*    (2006.01)

(52) U.S. Cl.
CPC ............. *F16H 55/36* (2013.01); *F16H 55/48* (2013.01)

(58) Field of Classification Search
CPC ........... F16H 55/36; F16H 55/48; F16H 55/44
USPC ......................................................... 474/161
See application file for complete search history.

(56) References Cited

U.S. PATENT DOCUMENTS

| | | | |
|---|---|---|---|
| 3,076,352 A * | 2/1963 | Larsh ..................... | F16H 55/06 74/443 |
| 3,541,873 A * | 11/1970 | Kramer ................... | F16H 55/14 474/161 |
| 3,592,511 A * | 7/1971 | Hudelson ........... | B62D 55/0966 301/64.302 |
| 3,610,066 A * | 10/1971 | Richlik .................... | F16H 55/06 74/434 |
| 3,651,705 A * | 3/1972 | Bertinetti ................ | F16H 55/06 474/161 |
| 3,666,322 A * | 5/1972 | Pickron .............. | B62D 55/0966 301/64.701 |
| 3,772,928 A * | 11/1973 | Gobeille ................. | F16H 55/48 474/170 |
| 3,946,618 A * | 3/1976 | Green ..................... | F16H 55/36 242/155 BW |
| 3,990,136 A * | 11/1976 | Hishida ................... | B23P 15/14 29/893.37 |
| 4,098,137 A * | 7/1978 | Yaros .................... | B21D 53/261 29/892.1 |
| 4,366,609 A * | 1/1983 | Speer .................. | B29C 45/1418 264/266 |
| 4,468,210 A * | 8/1984 | McCutchan, Jr. ...... | F16H 55/44 474/170 |
| 4,473,363 A * | 9/1984 | McCutchan, Jr. ...... | F16H 55/48 474/161 |
| 4,589,860 A * | 5/1986 | Brandenstein .......... | F16H 55/06 474/152 |
| 4,668,209 A * | 5/1987 | Kyoosei ............. | B29C 45/0046 474/190 |

(Continued)

*Primary Examiner* — Henry Y Liu
(74) *Attorney, Agent, or Firm* — Loginov & Associates, PLLC; William A. Loginov

(57) ABSTRACT

A hybrid drive component, such as a pulley, a drive sprocket, or an idler is composed of metal and composite material. The drive component manufacturing methods extend the overall life of the pulley while also reducing material usage and product weight thereby making the application more efficient. The drive component includes a drive element, a hub/bearing element and a connecting element. The connecting element is a molded construction that interconnects the drive element and the hub element.

12 Claims, 4 Drawing Sheets

(56) References Cited

U.S. PATENT DOCUMENTS

| | | | | |
|---|---|---|---|---|
| 4,717,370 A * | 1/1988 | Rohrig | F16F 15/124 | 474/161 |
| 4,722,722 A * | 2/1988 | Rampe | F16H 7/023 | 474/161 |
| 4,881,426 A * | 11/1989 | Serizawa | F16F 15/126 | 474/166 |
| 4,946,427 A * | 8/1990 | Rampe | F16H 7/023 | 29/892 |
| 5,069,654 A * | 12/1991 | Rampe | F16H 57/0025 | 474/161 |
| 5,074,828 A * | 12/1991 | Ellis | F16H 55/06 | 474/161 |
| 5,098,346 A * | 3/1992 | Redmond | F16H 55/171 | 474/161 |
| 5,120,279 A * | 6/1992 | Rabe | B29C 37/005 | 474/161 |
| 5,308,289 A * | 5/1994 | Funahashi | F16F 15/126 | 188/379 |
| 5,368,525 A * | 11/1994 | Funahashi | F16H 55/48 | 474/161 |
| 5,507,698 A * | 4/1996 | Kuribayashi | F16H 55/48 | 474/170 |
| 5,728,343 A * | 3/1998 | Ueno | B29C 45/1459 | 264/242 |
| 5,797,819 A * | 8/1998 | Arai | F16H 55/48 | 474/161 |
| 5,846,470 A * | 12/1998 | Funatsu | B29C 45/14 | 264/275 |
| 5,852,951 A * | 12/1998 | Santi | B29D 15/00 | 74/443 |
| 5,931,755 A * | 8/1999 | Mailey | B29C 45/27 | 474/161 |
| 6,099,426 A * | 8/2000 | Nakagomi | F16H 55/48 | 474/161 |
| 6,200,513 B1 * | 3/2001 | Emmett | F16H 55/48 | 264/274 |
| 6,355,195 B1 * | 3/2002 | Funatsu | B29C 45/14 | 264/156 |
| 6,432,343 B1 * | 8/2002 | Zollondz | B29C 39/021 | 264/255 |
| 6,482,140 B1 * | 11/2002 | Takatsu | B29C 45/14311 | 492/31 |
| 6,716,907 B2 * | 4/2004 | Asai | C08K 3/36 | 254/902 |
| 6,817,959 B1 * | 11/2004 | Blaimschein | F16H 55/17 | 474/152 |
| 6,881,166 B1 * | 4/2005 | Burkhardt | B61B 12/02 | 474/166 |
| 7,297,081 B2 * | 11/2007 | Eck | B29C 45/1418 | 474/161 |
| 7,452,926 B2 * | 11/2008 | Arai | C08K 3/24 | 523/149 |
| 7,824,287 B2 * | 11/2010 | Nonoshita | B62M 9/10 | 474/161 |
| 7,967,709 B2 * | 6/2011 | Emura | B62M 9/105 | 474/161 |
| 8,308,591 B2 * | 11/2012 | Hamada | F16H 55/48 | 474/199 |
| 8,962,734 B2 * | 2/2015 | Arai | C08L 61/06 | 524/494 |
| 9,011,282 B2 * | 4/2015 | Staples | B62M 9/12 | 474/160 |
| 9,416,863 B2 * | 8/2016 | Schaefer | F16H 55/48 | |
| 9,841,096 B2 * | 12/2017 | Bell | F16H 55/48 | |
| 10,302,184 B2 * | 5/2019 | Yokozawa | F16H 55/06 | |
| 10,830,329 B2 * | 11/2020 | Hirose | F16H 55/30 | |
| 11,009,112 B2 * | 5/2021 | Moore | B28B 1/24 | |
| 2003/0199351 A1 * | 10/2003 | Nichols | F16H 55/30 | 474/160 |
| 2005/0049096 A1 * | 3/2005 | Eck | B29C 45/14491 | 474/168 |
| 2005/0282672 A1 * | 12/2005 | Nonoshita | B62M 9/105 | 474/161 |
| 2006/0160647 A1 * | 7/2006 | Swane | F16H 55/36 | 474/166 |
| 2006/0167166 A1 * | 7/2006 | Koizumi | F16H 55/48 | 524/494 |
| 2007/0232427 A1 * | 10/2007 | Ueno | F16H 55/48 | 474/199 |
| 2007/0272781 A1 * | 11/2007 | Tsuda | C08L 61/06 | 242/155 R |
| 2008/0090687 A1 * | 4/2008 | Eck | B29C 45/14491 | 474/199 |
| 2009/0048392 A1 * | 2/2009 | Tsuda | C08L 2666/24 | 524/566 |
| 2011/0300979 A1 * | 12/2011 | Dutil | F16H 55/40 | 474/166 |
| 2014/0206486 A1 * | 7/2014 | Fuchs | F16H 55/30 | 474/161 |
| 2014/0357439 A1 * | 12/2014 | Schaefer | F16H 55/48 | 474/168 |
| 2016/0003340 A1 * | 1/2016 | Crump | F16H 55/30 | 474/161 |
| 2017/0204907 A1 * | 7/2017 | Zhao | F16C 19/06 | |
| 2017/0284528 A1 * | 10/2017 | Yokozawa | F16H 55/06 | |
| 2017/0292598 A1 * | 10/2017 | Moore | B62M 9/105 | |

* cited by examiner

HYBRID DRIVE COMPONENT

BACKGROUND OF THE INVENTION

The present invention relates to rotary drive transmission components, and more particularly to pulleys and drive wheels.

Common pulley manufacturing methods utilize stamped components which require part specific stamping dies that are costly to design, manufacture, and maintain. These stamped components are then assembled with welds and/or rivets using complex custom-built assembly equipment with long setup times. Some methods also require welding which creates heat distortion of the pulley and limits options for applying finishes to the final product.

These manufacturing methods for pulleys negatively affect the life expectancy and efficiency of the application in which they are utilized by inducing vibration, wear, corrosion, and increased rolling resistance. The overall mass of the pulley can also reduce the efficiency of the application as well as its ease of transportation.

Likewise, other pulley manufacturing methods are heavier or more prone to wear and conditions that degrade overall product life. Many of these methods also cause variations in how the bearing is captured resulting in excessive play or rolling resistance due to reduction in radial clearances of the bearing which ultimately leads to premature failures.

As can be seen, there is a need for an improved apparatus and methods to extend the overall life of the pulley while also reducing material usage and product weight thereby making the application more efficient.

SUMMARY OF THE INVENTION

In one aspect of the present invention a drive component is disclosed. The drive component includes a hub element, configured for axial rotation in conjunction with a shaft. A drive element has a drive face defined around an outer circumference of a central plate. The central plate has a central opening at a rotational axis of the drive component. A plurality of through holes are defined through a face of the central plate in a radially disposed spaced apart relation about the central opening. A connecting element formed of a moldable material interconnects the drive element and the hub element. The moldable material is formed around a portion of the central plate and through the through holes defined in the face of the drive element and around an outer face of the hub element.

In some embodiments, the hub element includes a cylindrical hub having a plurality of cogs radially emanating from the outer face of the hub element. Preferably, the cogs are disposed in a spaced apart relation around the outer face of the hub element. The ID of the hub may have additional features such as a keyway or spline for engagement with a shaft.

In other embodiments, a plurality of protrusions extend from at least one side of the central face of the drive element. The plurality of protrusions may be defined in a radially disposed spaced apart relation. Preferably, the plurality of protrusions are interposed between the plurality of through holes.

In yet other embodiments, a plurality of in indentations are defined in an opposite face from the protrusions.

In other embodiments, the hub element comprises a bearing.

In other aspects of the invention, a drive component has a hub element, configured for axial rotation in conjunction with a shaft. A drive element has a drive face defined around an outer circumference of a central plate. The central plate having a central opening at a rotational axis of the drive component. A plurality of through holes are defined through a face of the central plate in a radially disposed spaced apart relation about the central opening. A molded connecting element interconnects the drive element and the hub element. The molded connecting element extends through the plurality of through holes and around an outer face of the hub element.

In some embodiments, the drive component also includes a protrusion extending from the central plate, wherein the protrusion is molded into a body of the molded connecting element.

In other embodiments, an indentation is defined in an opposite side of the central plate from the protrusion.

In other embodiments, the hub element is a bearing assembly, wherein the molded connecting element is formed about an outer race of the bearing assembly.

In yet other embodiments, the hub element includes a cog protruding from and outer face of the hub element. The molded connecting element is formed about the cog.

These and other features, aspects and advantages of the present invention will become better understood with reference to the following drawings, description and claims.

DETAILED DESCRIPTION OF THE INVENTION

Figure 1:
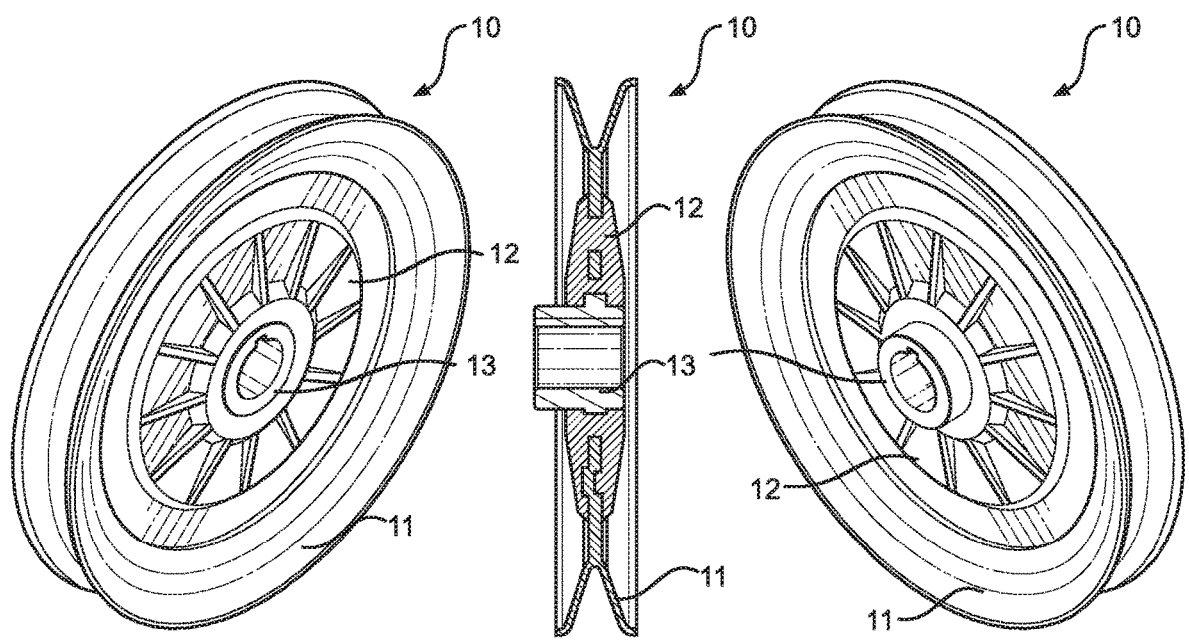
FIG. 1 is three perspective view of the hybrid drive pulley with the center view being a cross section.
Figure 2:
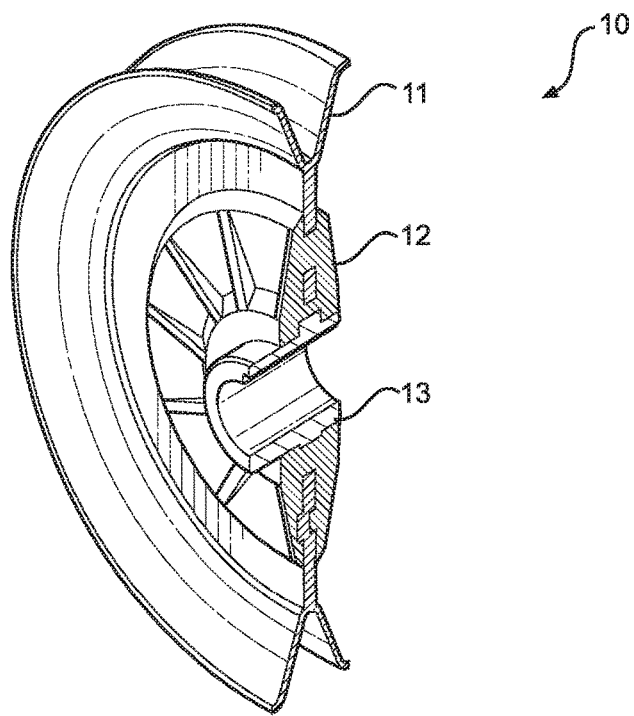
FIG. 2 is a upper left cross section perspective view of the hybrid drive pulley components.
Figure 3:
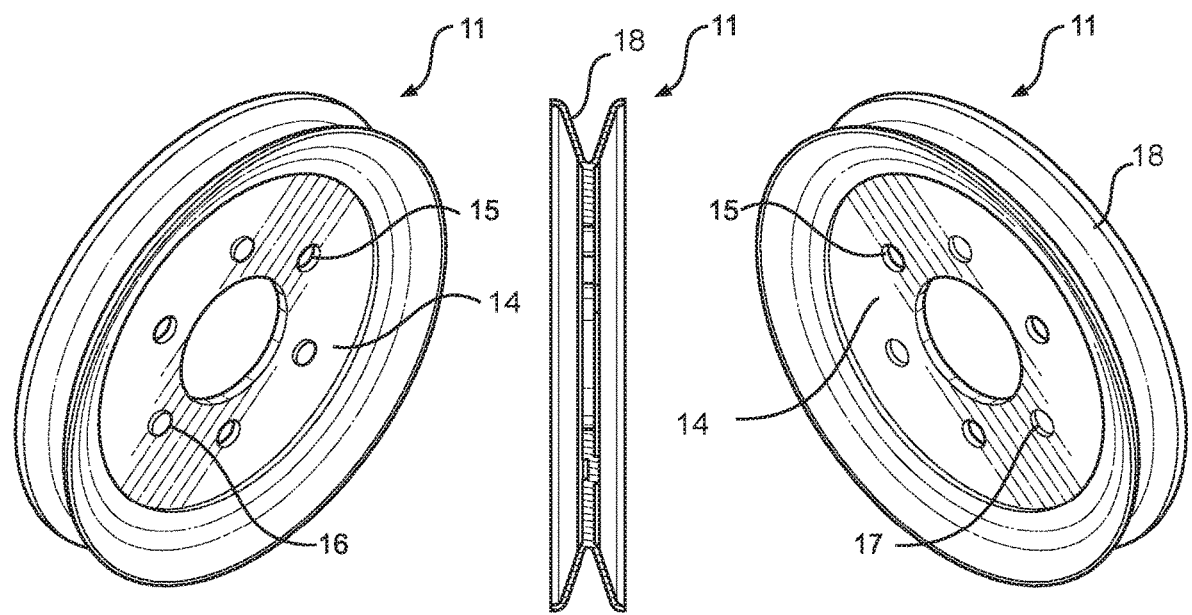
FIG. 3 is a perspective view of the drive element with the center view being a cross section.
Figures 4, 4A, 4B:
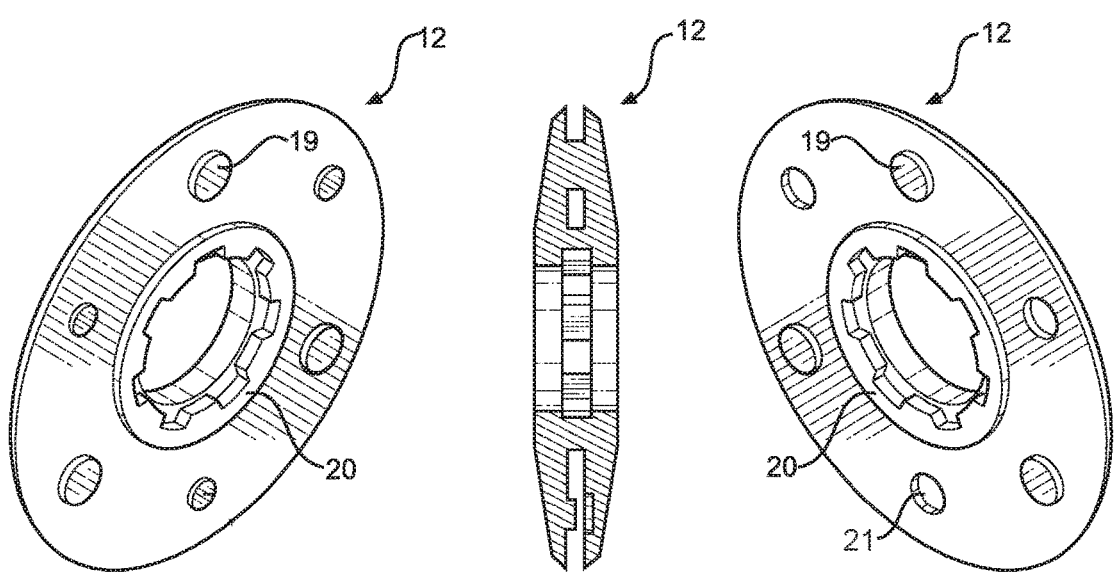
FIG. 4 is a cross section view of the connecting element.
FIG. 4a is a perspective view of a cross section of the connecting element at a left side of the hub recess shown in FIG. 4.
FIG. 4b is a perspective view of a cross section of the connecting element at a right side of the hub recess shown in FIG. 4.

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provide an improved apparatus and methods for rotary drive components, such as a drive pulley or an idler. An apparatus according to some aspects of the invention includes a hybrid, that is, a combination of a metallic component with a molded composite material in the construction of the rotary drive component.

As seen in reference to the drawings of FIGS. 1-7 a rotary drive component 10, such as a pulley or idler roller is shown.

The rotary drive component 10 includes a hub element 13 or 24, a connecting element 12, and a drive element 11.

The hub element, which may be one of a drive hub 13 for power transmission or a bearing assembly 24 for an idler configuration. The hub element 13 or 24 is surrounded by a connecting element 12 formed by an over mold composite material, such as a nylon, a plastic or other suitable material that interconnects the hub element 13 or 24 and the drive element 11.

Figure 5:
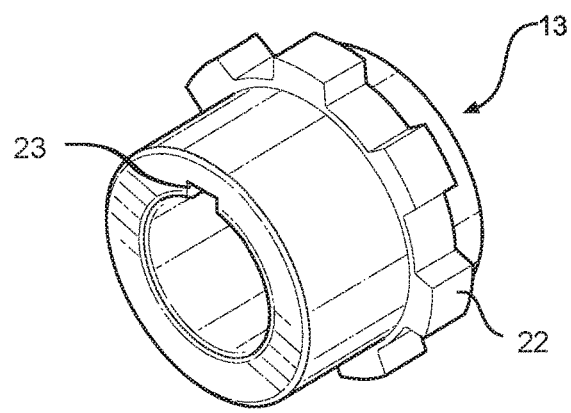
FIG. 5 is a perspective view of the drive hub.
Figure 6:
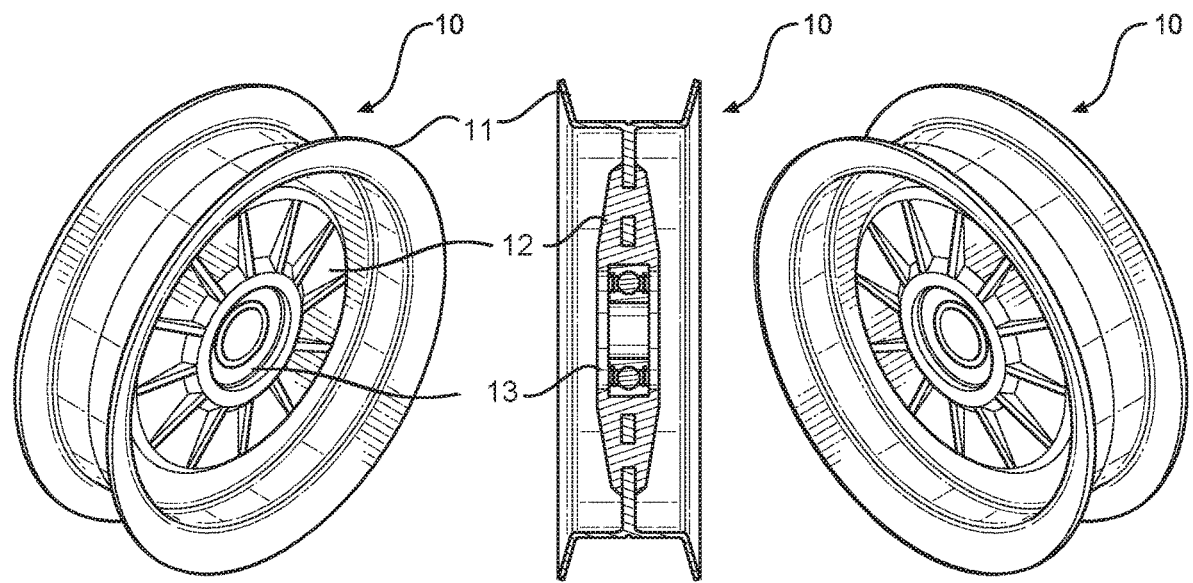
FIG. 6 is a perspective view of the hybrid idler pulley with the center view being a cross section.

As best seen in reference to FIG. 5, the hub element 13 may be formed as a cylindrical hub having a plurality of cogs 22, or protrusions, radially emanating from a surface of the hub element 13. The cogs 22 are disposed in a spaced apart relation around an outer circumference of the hub 13. The hub element 13 may also include a ID feature 23 for receiving an alignment spline, or key stock, or other engagement means to connect the rotary drive component 10 to a shaft. Depending on the application, the hub 13, cogs 22 may be positioned at a mid point of the hub element 13 or they may be offset so that a portion of the hub element 13 protrudes from a face of the drive component 10, as seen in reference to FIG. 2.

Figure 7:
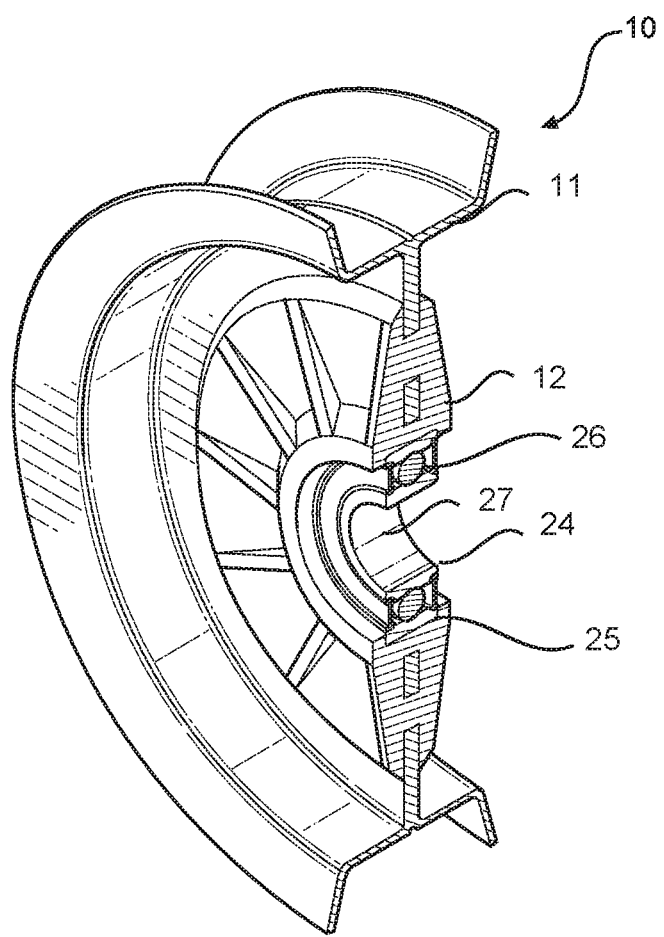
FIG. 7 is a perspective cross section side view of the hybrid idler pulley.

As best seen in reference to FIG. 7, the hub element 13 may alternatively be a bearing assembly 24. The bearing assembly 24 includes an outer race 25, an inner race 27. A plurality of rollers or ball bearings 26 may be carried between the outer race 25 and the inner race 27.

The drive element 11 may include a drive face 18 defined around an outer circumference of the drive element 11. In the non-limiting embodiments shown, the drive face 18 is formed as a pulley face for carrying a V-belt in a belt driven mechanism. In other embodiments, the drive face 18 may be shaped for carrying a serpentine belt. The drive face 18 may be smooth, or it may have circumferential or transverse ribs for engagement with the serpentine belt. As will be appreciated from the present disclosure, the drive face 18 may also include a toothed configuration for carrying a chain in a chain drive mechanism. The drive face 11, is carried on a central plate 14 having a central opening defined at the rotational axis of the drive component 10.

A plurality of through holes 15 are defined through the face of the central plate in a radially disposed spaced apart relation about the through hole. A plurality of protrusions 16 may also be defined in at least one face of the central plate 14. In some embodiments an indentation 17 is defined in the central plate 14 opposite the protrusions 16. The protrusions 16 and indentations 17, when present, are defined in a radially disposed, spaced apart relation about the through hole. The protrusions 16 and indentations 17 may be interposed between the plurality of through holes 15.

The connecting element 12 is formed of a moldable material and interconnects the drive element 11 and the hub element 13 or 24. The connecting element 12 is molded, such as via injection molding, so that the material flows through the apertures 15 defined through the face 14 of the drive element 11. Because the material filling the apertures 15 are susceptible to shearing by action of the drive element 11 in conveyance of torque from the drive element 11, the moldable material that formed around the plurality of protrusions 16 and filling recessed areas 17 provide an additional torque transmission element that acts on the body of the connecting element 12 providing enhanced torque transmission capabilities.

Likewise, the moldable material forms around the hub element 13. In the case of a drive hub 13, the moldable material of the connecting element forms around the cogs 22 of the drive hub 13 for conveying torque to/from the shaft upon which the drive hub 13 is attached. In the case of a bearing 24, the moldable material of the connecting element 12 is formed around at least one side of the outer race 25 of the bearing 24.

As indicated previously, other pulley manufacturing methods are more prone to premature failures in use or high scrap rates during manufacturing due to thickness variation in raw materials and material composition. In other aspects of the invention, a method of making the drive component 10 extends the life of the drive component 10 while also reducing material usage and product weight thereby making the application more efficient.

The drive element 11 may be formed from a stamped blank of a sheet of metal material, such as steel or aluminum. The blank may be formed in a stamping press or a split/spin forming machine to create the desired drive element 11 shape. The drive element 11 may be coated as needed, such as a paint, a plating, or other finish.

The formed drive element is placed into a die cavity in an injection molding machine. The hub element 13 is placed into a center of the die cavity in the injection molding machine. An injection molding cycle injects the composite material (nylon, plastic or other) into the die cavity to over-mold the bearing/hub 24, 13 and formed drive element 11. The molded material is allowed to cool in the die. The finished hybrid pulley may then be ejected from the die.

As will be appreciated, the present invention can be used to drive, apply tension or change direction to belt, rope, cable, or chain systems on all new applications and can also be used as a direct replacement to existing pulleys manufactured using previous manufacturing methods.

It should be understood, of course, that the foregoing relates to exemplary embodiments of the invention and that modifications may be made without departing from the spirit and scope of the invention as set forth herein.

What is claimed is:

1. A drive component, comprising:
a hub element, configured for axial rotation about a shaft;
a drive element having a drive face defined around an outer circumference of a central plate having a central opening at a rotational axis of the drive component, wherein a plurality of through holes are defined through a face of the central plate in a radially disposed spaced apart relation about the central opening, wherein a plurality of protrusions extend from at least one side of the central plate of the drive element; and
a connecting element formed of a moldable material that interconnects the drive element and the hub element wherein the moldable material: is formed around a portion of the central plate; is formed through the plurality of through holes defined in the face of the drive element; is formed over the plurality of protrusions in the at least one side of the central plate of the drive element; and is formed around an outer face of the hub element.

2. The drive component of claim 1, wherein the hub element further comprises:
a cylindrical hub having a plurality of cogs radially emanating from the outer face of the hub element.

3. The drive component of claim 2, wherein the cogs are disposed in a spaced apart relation around the outer face of the hub element.

4. The drive component of claim 3, wherein the hub element further comprises:
an ID feature for receiving an alignment key to connect the drive component to the shaft.

5. The drive component of claim 1, wherein the plurality of protrusions are defined in a radially disposed spaced apart relation.

6. The drive component of claim 5, wherein the plurality of protrusions are interposed between the plurality of through holes.

7. The drive component of claim 1, further comprising:
a plurality of indentations defined in an opposite face from the protrusions.

8. The drive component of claim 1, wherein the hub element comprises a bearing.

9. A drive component, comprising:
a hub element, configured for axial rotation about a shaft;
a drive element having a drive face defined around an outer circumference of a central plate having a central opening at a rotational axis of the drive component, wherein a plurality of through holes are defined through a face of the central plate in a radially disposed spaced apart relation about the central opening, and wherein a plurality of protrusions extend from at least one side of the central plate of the drive element; and
a molded connecting element interconnecting the drive element and the hub element, wherein the molded connecting element extends through the plurality of through holes, is formed over the plurality of protrusions in the at least one side of the central plate of the drive element, and extends around an outer face of the hub element.

10. The drive component of claim 9, further comprising:
an indentation defined in an opposite side of the central plate from the protrusion.

11. The drive component of claim 10, wherein the hub element further comprises:
a bearing assembly, wherein the molded connecting element is formed about an outer race of the bearing assembly.

12. The drive component of claim 10, wherein the hub element further comprises:
a cog protruding from an outer face of the hub element, wherein the molded connecting element is formed around the cog.

* * * * *